US012645188B2

(12) United States Patent
Rasmussen et al.

(10) Patent No.: US 12,645,188 B2
(45) Date of Patent: Jun. 2, 2026

(54) ARRANGEMENT AND A METHOD FOR BALANCING POWER IN AN AC POWER TRANSMISSION SYSTEM

(71) Applicant: Hitachi Energy Ltd, Zürich (CH)

(72) Inventors: Jon Rasmussen, Västra Frölunda (SE); Richard Rivas, Västerås (SE); Haofeng Bai, Västerås (SE); Jean-Philippe Hasler, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 19/236,582

(22) Filed: Jun. 12, 2025

(65) Prior Publication Data

US 2025/0383633 A1 Dec. 18, 2025

(30) Foreign Application Priority Data

Jun. 12, 2024 (EP) ..................................... 24181595

(51) Int. Cl.
*G05B 13/02* (2006.01)
*H02J 3/32* (2026.01)

(52) U.S. Cl.
CPC ............ *G05B 13/0205* (2013.01); *H02J 3/32* (2013.01)

(58) Field of Classification Search
CPC ............................... G05B 13/0205; H02J 3/32
See application file for complete search history.

(56) References Cited

U.S. PATENT DOCUMENTS

| | | | | |
|---|---|---|---|---|
| 11,581,737 B2 * | 2/2023 | Armschat | ................. | H02J 3/32 |
| 2003/0011348 A1 * | 1/2003 | Lof | ......................... | H02J 3/381 |
| | | | | 322/37 |

(Continued)

FOREIGN PATENT DOCUMENTS

| | | |
|---|---|---|
| CN | 115693749 A | 2/2023 |
| IN | 359295 B | 2/2021 |

(Continued)

OTHER PUBLICATIONS

Jayanti et al., "Rating requirements of the unified power quality conditioner to integrate the fixed-speed induction generator-type wind generation to the grid", IET Renewable Power Generation, 2009, vol. 3, No. 2, pp. 133-143.

(Continued)

*Primary Examiner* — Ziaul Karim
(74) *Attorney, Agent, or Firm* — PROCOPIO, CORY, HARGREAVES & SAVITCH LLP

(57) ABSTRACT

An arrangement, which is connectable to an alternating current (AC) power transmission system, comprising a static synchronous compensator device having a converter unit and an energy storage unit connected with the converter unit; a power absorption device; and a control device connected with the static synchronous compensator device and with the power absorption device. The control device is configured to control the static synchronous compensator device to exchange power with the AC power transmission system, and to control the power absorption device in dependence of a state of charge of the energy storage unit and a state of the power transmission system. The control device is configured to determine whether there is a need to absorb active power from the AC power transmission system in excess of what the static synchronous compensator device is absorbing and, (Continued)

in case of a need, control the power absorption device to absorb active power.

13 Claims, 5 Drawing Sheets

(56)                    References Cited

U.S. PATENT DOCUMENTS

| | | | | |
|---|---|---|---|---|
| 2008/0232143 A1* | 9/2008 | Chu | .......................... | H02J 3/1842 |
| | | | | 363/37 |
| 2010/0292852 A1* | 11/2010 | Gertmar | ................ | H02J 3/1842 |
| | | | | 290/44 |
| 2018/0083447 A1* | 3/2018 | Lee | ............................ | H02J 3/14 |
| 2022/0166222 A1* | 5/2022 | Varma | ..................... | H02J 3/388 |
| 2022/0166223 A1* | 5/2022 | Varma | ..................... | H02J 3/388 |

FOREIGN PATENT DOCUMENTS

| | | | |
|---|---|---|---|
| JP | H04289732 A | 10/1992 |
| JP | 2016-103968 A | 6/2016 |
| WO | 2022234497 A1 | 11/2022 |
| WO | 2024002478 A1 | 1/2024 |

OTHER PUBLICATIONS

Wu et al., "Application of a Static Reactive Power Compensator (STATCOM) and a Dynamic Braking Resistor (DBR) for the Stability Enhancement of a Large Wind Farm", Wind Engineering vol. 27, No. 2, 2003, p. 93-106.
Extended European Search Report, issued in European Patent Application No. 24181595.0, mailed Dec. 17, 2024, 10 pages.

* cited by examiner

ARRANGEMENT AND A METHOD FOR BALANCING POWER IN AN AC POWER TRANSMISSION SYSTEM

CROSS-REFERENCE TO RELATED APPLICATIONS

The present application claims priority to European Patent Application No. 24181595.0, filed on Jun. 12, 2024, which is hereby incorporated herein by reference as if set forth in full.

TECHNICAL FIELD

The present disclosure generally relates to power transmission systems, and more particularly it relates to an arrangement and a method for balancing power in the power transmission system by means of a static synchronous compensator device.

BACKGROUND

In a power transmission system, such as the AC grid (alternating current grid), there is a need for stabilizing activities. Historically, the inertia of power production plants, such as rotating electrical generators in fossil, nuclear, and hydroelectric power plants has been used as a stabilizing means. With the growing portion of renewal energy plants, such as solar and wind power plants the amount of inertia is decreasing. Other ways of stabilizing the power transmission systems have been developed. One of them is to use static synchronous compensators having a combination of a converter and an energy storage to either absorb power from or deliver power to, both reactive power and active power, the power transmission system. Such a static synchronous compensator is generally called E-STATCOM, or Enhanced STATCOM. Thus, in particular, by means of the energy storage active power, in addition to reactive power, can be both absorbed from and delivered to the AC grid. However, the E-STATCOM has limited energy and power capacity due to the fixed energy storage, consisting of batteries, super-capacitors or other types of storage. A straight-forward solution would be to just add further E-STATCOMS or build them larger, but there are clear practical limits both as to the actual physical size and the costs for building them that call for some more efficient solution.

SUMMARY

In view of the foregoing, a concern of the present disclosure is how to reduce the shortcomings of the prior art.

To better address this concern, in a first aspect thereof, the present disclosure provides an arrangement which is connectable to an alternating current, AC, power transmission system. The arrangement comprises a static synchronous compensator device having a converter unit and an energy storage unit connected with the converter unit, a power absorption device, and a control device connected with the static synchronous compensator device and with the power absorption device. The control device is configured to control the static synchronous compensator device to exchange power with the AC power transmission system, and to control the power absorption device in dependence of a state of charge of the energy storage unit and a state of the power transmission system. The control device is configured to determine whether or not there is a need to absorb active power from the AC power transmission system in excess of what the static synchronous compensator device is currently absorbing and to, in case of such a need, control the power absorption device to absorb active power.

By determining that there is a need of absorbing power in excess of what the STATCOM device is currently capable of, active power will be dissipated by means of the power absorption device, causing an improved balancing of the AC power system.

The power absorption device may comprise a resistor unit and a current control unit connected in series with the resistor unit, wherein the control device, when controlling the power absorption device to absorb active power, is configured to control the current control unit to provide current to the resistor unit.

The power absorption device may comprise a separate branch for each phase that it is configured to be connected to, wherein the current control unit comprises a separate current control module for each branch, and the resistor unit comprises a separate resistor module for each branch, wherein the current control module and the resistor module of each branch are connected in series.

The power absorption device may, for instance, be activated while the energy storage unit is being charged but is not absorbing power fast enough, or when the energy storage unit has reached an upper limit, such as being fully charged or being charged up to a predetermined level, which is lower that full, and is therefore not capable or allowed to absorb any more power.

The power absorption device may further be configured to be connected to the AC power transmission system in parallel with the static synchronous compensator device.

The power absorption device may further be configured to act as a backup device for the static synchronous compensator device with regard to power absorption.

The power absorption device may be configured to be connected to merely one or two phases of the AC power transmission system.

The power absorption device may be configured to be connected to a direct current, DC, side of the static synchronous compensator device in parallel with the energy storage unit.

The current control unit may comprise semiconductor elements, such as thyristors, e.g. IGCTs or GTOs, IGBTs, IEGTs, etc.

According to a second aspect thereof, the present disclosure provides a method of controlling an arrangement which is connected to an alternating current, AC, power transmission system. The arrangement comprises a static synchronous compensator device having a converter unit and an energy storage unit connected with the converter unit, and a power absorption device. The method comprises controlling the static synchronous compensator device to exchange power with the AC power transmission system, and controlling the current control unit in dependence of a state of charge of the energy storage unit and a state of the power transmission system, including determining whether or not there is a need to absorb active power from the AC power transmission system in excess of what the static synchronous compensator device is currently absorbing and, in case of such a need, controlling the power absorption device to absorb active power.

The operation of determining may comprise at least one of determining that a state of charge, SOC, of the energy storage unit has reached an upper limit, e.g. 100%, i.e. the energy storage unit is fully charged, or a predetermined SOC less than 100%, and detecting that the need for power absorption is raising faster than the energy storage unit is able to handle.

The operation of controlling the static synchronous compensator device to exchange power with the AC power transmission system may comprise controlling the SOC of the energy storage unit to be between a state of fully discharged and a state of fully charged when there is no need for exchanging power with the AC power transmission system.

The power absorption device may be connected to merely one or two phases of the AC power transmission system and in parallel with the static synchronous compensator device, wherein the operation of controlling the static synchronous compensator device to exchange power with the AC power transmission system may comprise balancing asymmetrical currents caused by the power absorption device.

The method may be used for stabilizing the frequency of the AC power transmission system.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that the present disclosure is not limited to the particular component parts of the device described or steps of the methods described as such device and method may vary. It is also to be understood that the terminology used herein is for purpose of describing particular embodiments only, and is not intended to be limiting.

BRIEF DESCRIPTION OF THE DRAWINGS

Exemplifying embodiments will now be described in more detail and with reference to the appended drawings in which.

All the figures are schematic, not necessarily to scale, and generally only show parts which are necessary in order to elucidate the embodiments, wherein other parts may be omitted or merely suggested. Like reference numerals refer to like elements throughout the description.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Figure 1:
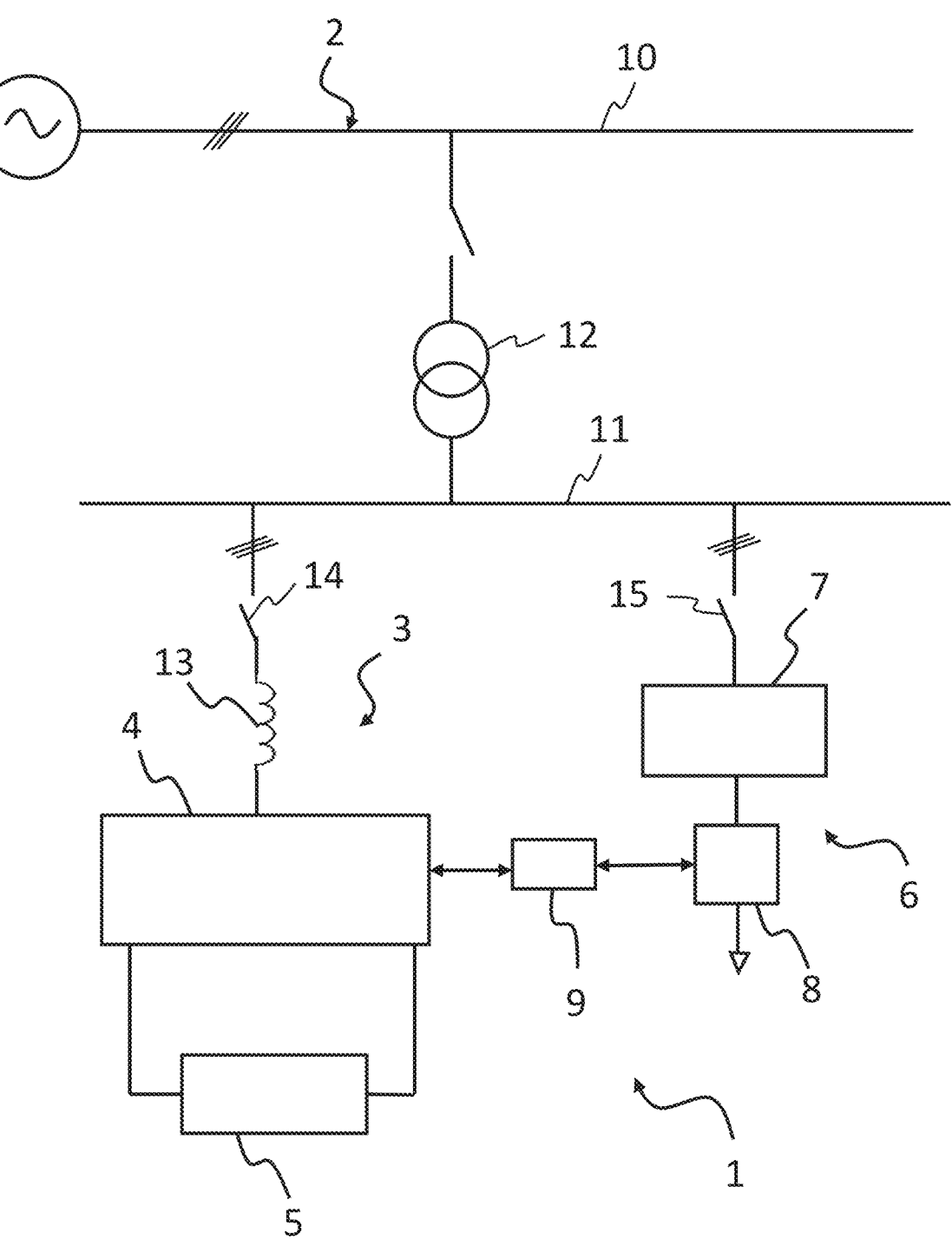
FIGS. 1 to 4 show block diagrams of embodiments of the arrangement according to the present disclosure.

FIG. 1 shows a most general view of an arrangement 1, which is connected to an alternating current, AC, power transmission system 2. The arrangement 1 comprises a static synchronous compensator device, STATCOM device, 3 having a converter unit 4 and an energy storage unit 5 connected with the converter unit 4. The arrangement 1 further comprises a power absorption device 6 having a resistor unit 7 and a current control unit 8 connected in series with the resistor unit 7, and a control device 9 connected with the STATCOM device 3 and with the power absorption device 6. It should be noted that the shown AC power transmission system 2 typically is a 3-phase system, as indicated by the three short parallel lines obliquely crossing some of the other lines, and that the different parts involved, typically, act on all three phases. There are alternative embodiments where some of them may only act on one or two phases, as will be described below.

Figure 6:
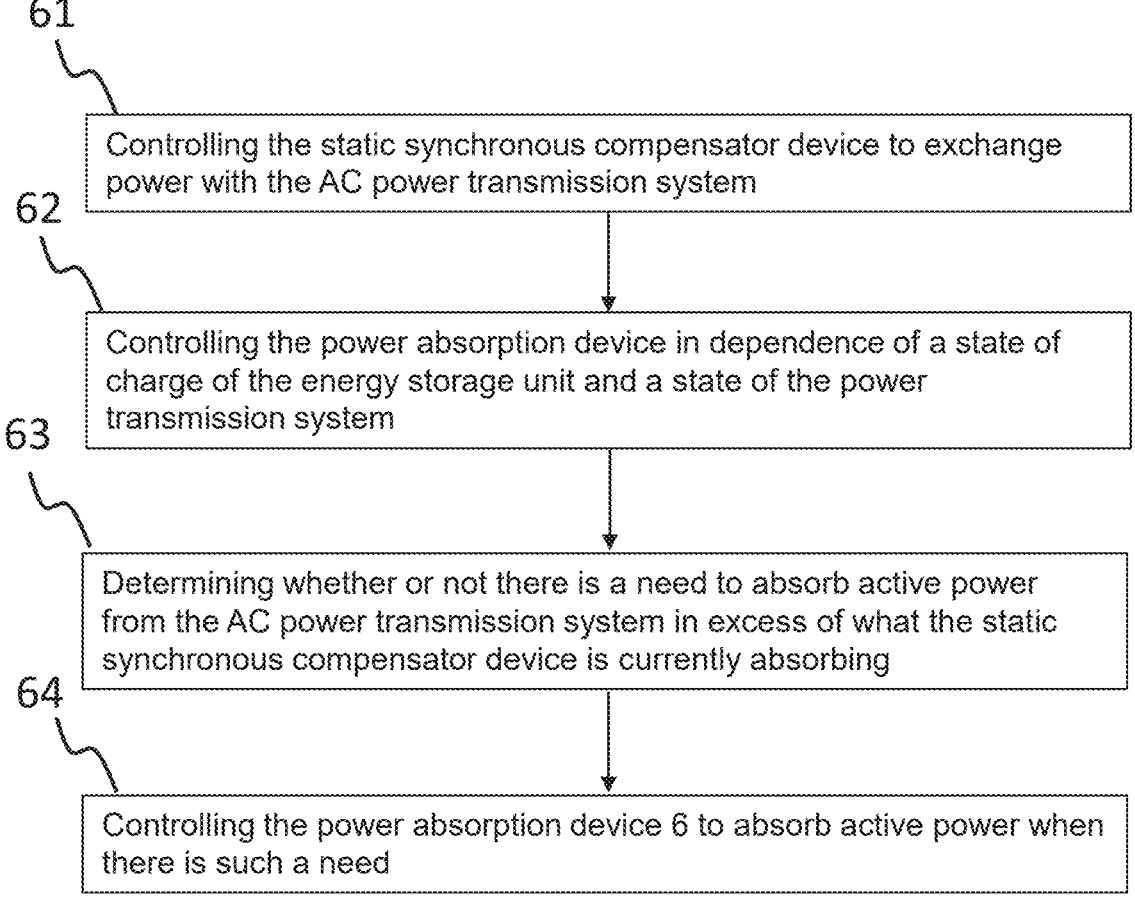
FIG. 6 shows a flowchart of an embodiment of the method according to the present disclosure.

According to an embodiment of the present method, as shown in the flowchart of FIG. 6, the control device 9 is configured to control the STATCOM device 3 to exchange power with the AC power transmission system 2, box 61, and to control the power absorption device 6 in dependence of a state of charge of the energy storage unit 5 and a state of the AC power transmission system 2, box 62. The controlling of box 62 includes determining whether or not there is a need to absorb active power from the AC power transmission system in excess of what the static synchronous compensator device is currently absorbing, box 63. In case of such a need, the method comprises controlling the power absorption device 6 to absorb active power, box 64. More particularly, the control device 9 may be configured to determine that there is a need to absorb active power from the AC power transmission system 2 in excess of what the STATCOM device 3 is currently absorbing and control the current control unit 8 to provide a current to the resistor unit 7. Thereby, active power is dissipated in the resistor unit 7. As already mentioned above, what the STATCOM device 3 is currently absorbing may depend on several different factors. For instance, a maximum SOC may have been set in advance to a level that is less than 100% or it may be allowed to reach 100%. As another example, the maximum charge rate of the energy storage unit 5 may be below the required absorption rate, i.e. how fast the need for absorbing active power from the AC power transmission system 2 raises.

The AC power transmission system 2 may comprise a high voltage, HV, transmission line, or bus, 10, a medium voltage, MV, transmission line, or bus, 11, and a 3-phase transformer device 12 interconnecting them. The 3-phase transformer device 12 may be a full 3-phase transformer or three single-phase transformers. The three phases may, for instance, be connected as wye or delta. The STATCOM device 3 and the power absorption device 6 may be connected to the MV transmission line 11 in parallel with each other, as shown in FIG. 1. Since the STATCOM device 3 has both a converter unit 4 and an energy storage unit 5 it is capable of handling both reactive power and active power. The converter unit 4 can be of any suitable kind, as recognized by the person skilled in the art, e.g. a VSC (Voltage Source Converter), such as an MMC (Multi Modular Converter). The converter unit 4 comprises a reactance 13 and a main breaker 14, or more particularly one reactance and breaker per phase, at its AC terminals. Similarly, the power absorption device 6 may comprise a main breaker 15 at its terminal connected to the MV transmission line 11. The main breakers 14, 15 are optional. The energy storage unit 5 may comprise battery modules, supercapacitor modules, or combinations thereof. As regards the power absorption device 6, for each phase the resistor unit 7 may comprise one or more resistors, and the current control unit 8 may comprise one or more elements which can be switched on and off as desired to control the amount of current flowing through the resistors, and/or the time distribution between current on time and off time, to thereby control the amount of power that is absorbed.

Figure 2:
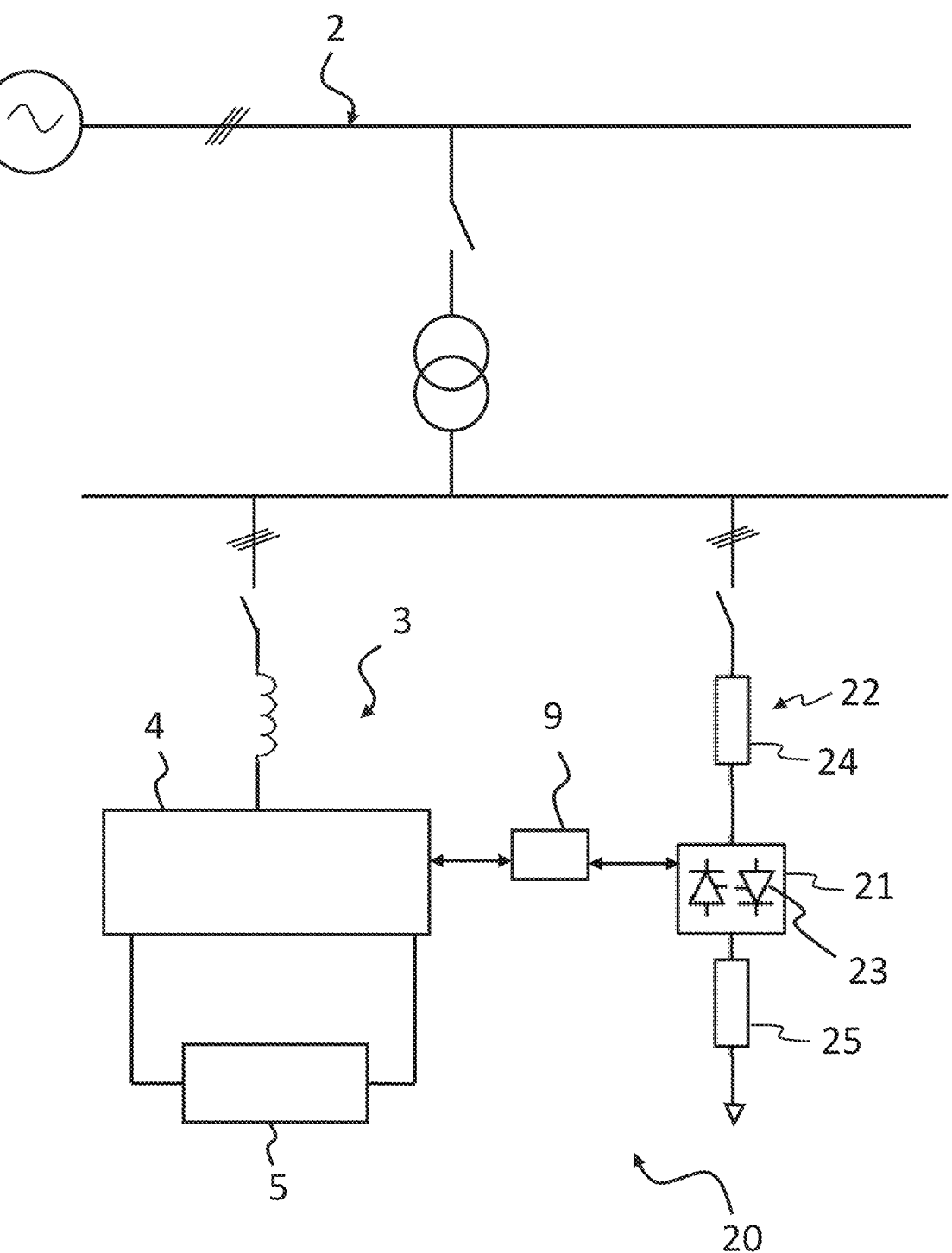

An embodiment of the arrangement 20 is shown in FIG. 2. Again, although understood by the person skilled in the art, it should be noted that the structure of the power absorption device 6 that is shown in FIG. 2 is applied to each phase, so for the typical 3-phase system there are three identical structures, or branches, one for each phase. One of these branches is shown in FIG. 2. Thus, for each branch the current control unit 8 comprises a separate current control module 21, and the resistor unit comprises a separate resistor module 22 for each branch, wherein the current control module 21 and the resistor module 22 of each branch are connected in series. According to this embodiment the current control module 21, and thus the current control unit 8, may comprise thyristors 23, and the resistor module 22 comprises two resistors 24, 25 connected in series with the current control module 21, wherein one of the resistors 24 is arranged upstream of the current control module 21, and the other resistor 25 is arranged downstream of the current control module 21 with regard to the current flow through the branch.

The current through the resistors 24, 25 is continuously controllable by setting the firing angles of the thyristors 23. Consequently, any current level from zero to a maximum current level can be provided by means of controlling the firing angles of the thyristors 23. The power absorption device 6 is thereby capable of providing a variable additional active power consumption that is needed for the AC power transmission system 2 but presently is not available in the STATCOM device 3. In other words, the active power absorption can be advantageously extended beyond the capability of the energy storage unit 5. By controlling, by means of the control device 9, the power absorption device 6 together with the STATCOM device 3, a smooth transition between merely charging the energy storage unit 5 and additionally dissipating power in the resistors 24, 25 can be achieved. The permitted duration of dissipating power in the power absorption device 6 is a matter of power rating of the resistors 24, 25, since the power dissipation causes an increase of temperature of the resistors 24, 25. The power rating may therefore be appropriately chosen to provide a high enough power dissipation capacity. Further, for the resistors 24, 25 the resistor temperature as a function of the magnitude of the current through the resistor may be estimated in order to determine a remaining duration. At a certain point the current may have to be limited not to overheat the resistor.

Figure 5:
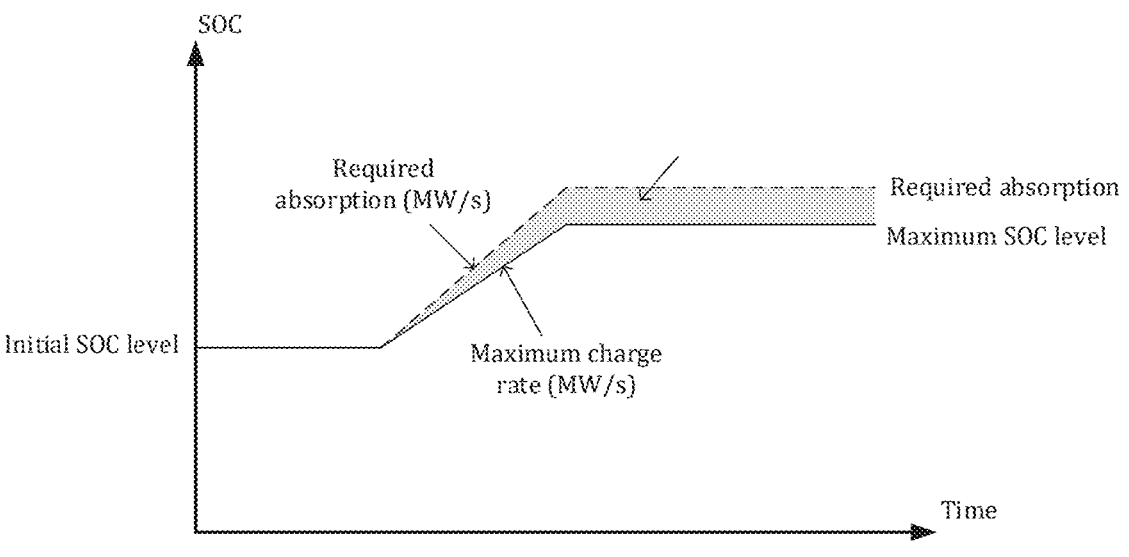
FIG. 5 illustrates an example of handling of power by means of the arrangement.

The additional need for consumption of active power may be caused by, for instance, the energy storage unit 5 being fully charged, i.e. SOC=100%, or having reached a predetermined maximum allowable SOC below 100%, and thus not being able to absorb any more power, or the need raising faster than the energy storage unit 5 is capable of handling at its maximum charge rate. The reason for the energy storage unit 5 being fully charged may, in turn, be caused by a duration of the need for absorbing power being excessively long. This scenario is illustrated in FIG. 5, where it is seen that the energy storage unit 5 has a state of charge, SOC, at about 50%, i.e. about half of its total capacity, at the beginning of the shown time period. This SOC is also an idle state. Then a need for absorbing power from the AC power transmission system 2 arises and the charging of the energy storage unit 5 begins. However, as indicated by the upper most broken line, the need for power absorption increases faster than the energy storage unit 5 alone is able to fulfil, i.e.

the required absorption rate is higher than the highest charge rate that the energy storage unit 5 is capable of delivering. Thus, the power balancing of the AC power transmission system is not obtained in full. This is detected by the control device 9, which then controls the power absorption device 6 to support the STACOM device 3 by starting to dissipate power in the resistor unit 7. As the difference between need and the capability of the energy storage unit 5 increases by time, the current control unit 8 adapts the firing angles of the thyristors 23 to increase the current through the resistors 24, 25.

Additionally, the power absorption device 6 may be used as a backup in case the STATCOM device 3 is out of service. The arrangement 1 will then only be able to absorb power and not generate any power, but it will still be available in this reduced mode of operation.

For sake of completeness, it should be noted that the control device 9 is, of course, also configured to determine that there is a need for delivering power to the AC power transmission system 2. Then, the control device 9 will control the STATCOM device 3 to deliver that power, which may include discharging the energy storage unit 5.

It may also be possible to use the power absorption device 6 to discharge the energy storage unit 5 instead of external discharge resistors, which are often used at the DC side of the STATCOM device 3. A smaller backup discharging resistor may still be needed in case the converter unit 4 is unavailable. This is useful when controlling the SOC of the energy storage unit 5 to be between 0% and 100% when there is no need for exchanging power with the AC power transmission system 2. Then the SOC of the energy storage unit 5, which may be called an idle state of charge, may be controlled to about 50% to have a good margin for both charging and discharging, depending on the needs of the AC power transmission system 2.

Further, an advantage with the power absorption device 6 is that the idle SOC may be set at more than 50%, relying on the power absorption capability of the power absorption device 6 if the excessive need arises. Thereby, the ability to deliver active power to the AC power transmission system 2 is increased.

There may be some reactive power consumed by the power absorption device 6. This reactive power consumption may be compensated for by the converter unit 4.

Figure 3:
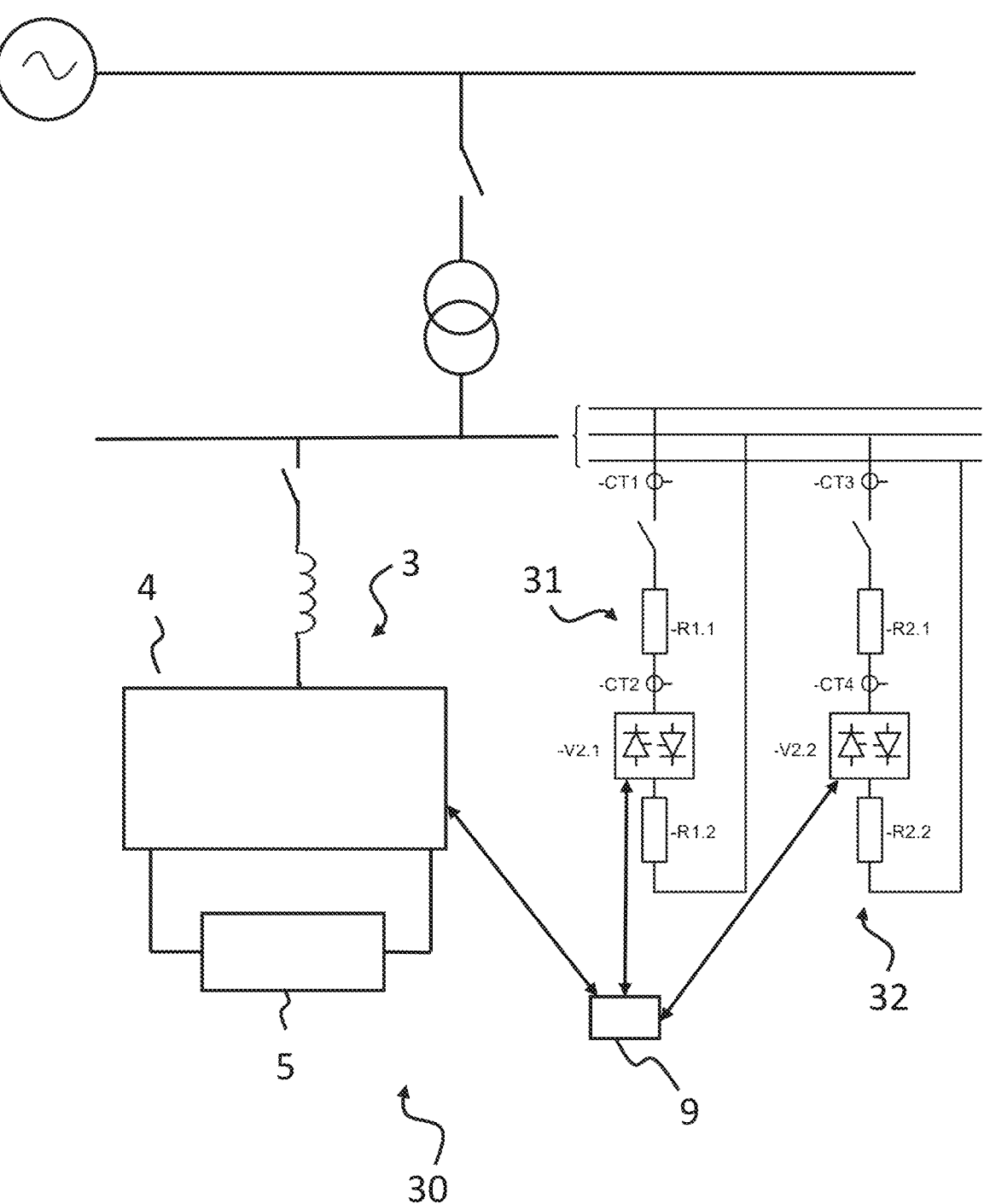

According to an embodiment of the arrangement 30, as shown in FIG. 3, the power absorption device 6 has two branches 31, 32. A first branch thereof is connected to a first phase and a second phase of the 3-phase MV power transmission line 11, and a second branch 32 thereof is connected to the second phase and to the third phase. With this embodiment, advantageously, the number of current control modules, resistor modules, etc., will be reduced compared to a full 3-phase structure. On the other hand, when operating the power absorption device 6 with two branches, an imbalance is introduced. The control device 9 is configured to compensate for this imbalance by means of the STATCOM device 3. Having the control device 9 configured for compensating phase imbalances also in the above described embodiment with full three branches will provide an advantage. If one or two phases are out of service, then the control device 9 will be able to better handle such a situation, which may be regarded as a reduced operation mode of the arrangement 1. Thereby, an increased energy availability will be provided to the AC power transmission system 2.

Figure 4:
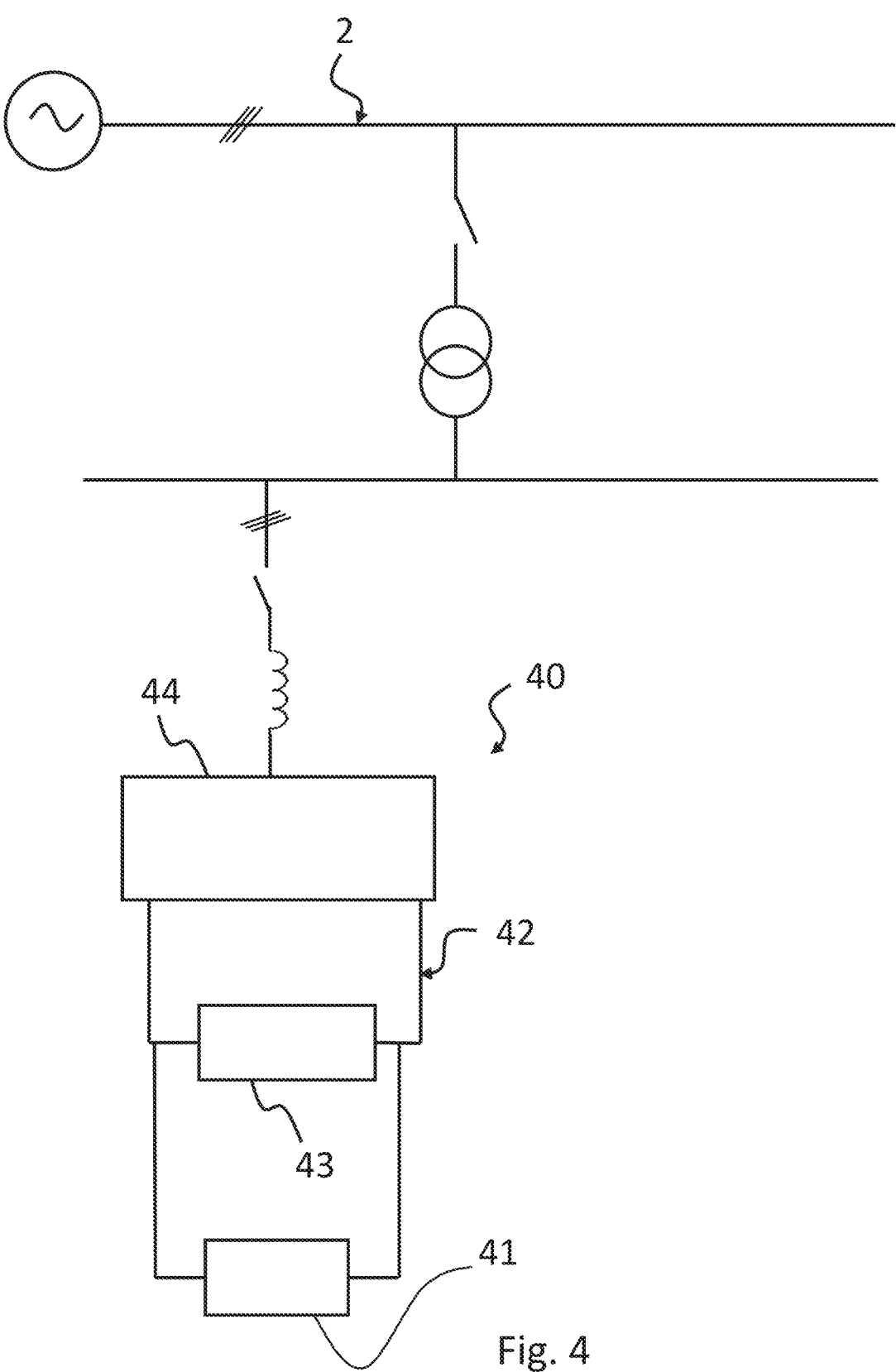

According to an embodiment of the arrangement 40, as shown in FIG. 4, the power absorption device 41 is connected directly with the STATCOM device 3. More particularly, the power absorption device 41 is connected to a direct current, DC, side of the STATCOM device 42 in parallel with the energy storage unit 43. Since the power absorption device 41 is connected to the DC side of the STATCOM device 43, it is appropriate to use IGBT/IGCT or similar elements in the current control unit of the power absorption device 41 instead of thyristors. The overall system benefits are the same regardless of where the power absorption device 41 is located, the resistor unit of the power absorption device 41 is expected to have the same energy rating in both cases. It should be noted that when connecting the power absorption device 41 to the DC side, the active power needs to be transferred through the converter unit of the STATCOM device 44, in comparison with the above embodiment where the power absorption device 6 is connected to the MV transmission line 11 in parallel with the STATCOM device 3.

While the present disclosure has been illustrated and described in detail in the drawings and foregoing description, such illustration and description are to be considered illustrative or exemplary and not restrictive.

Although features and elements are described above in particular combinations, each feature or element can be used alone without the other features and elements or in various combinations with or without other features and elements.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain features are recited in mutually different dependent claims does not indicate that a combination of these features cannot be used to advantage. Any reference signs in the claims should not be construed as limiting the scope.

The invention claimed is:

1. An arrangement which is connectable to an alternating current (AC) power transmission system, the arrangement comprising: a static synchronous compensator device having a converter unit and an energy storage unit connected with the converter unit; a power absorption device; and a control device connected with the static synchronous compensator device and with the power absorption device, wherein the control device is configured to control the static synchronous compensator device to exchange power with the AC power transmission system, and to control the power absorption device in dependence of a state of charge of the energy storage unit and a state of the power transmission system, and wherein the control device is configured to determine whether or not there is a need to absorb active power from the AC power transmission system in excess of what the static synchronous compensator device is currently absorbing, and when determining that there is the need, control the power absorption device to dissipate active power, and wherein the power absorption device comprises a resistor unit and a current control unit connected in series with the resistor unit, wherein the control device, when controlling the power absorption device to dissipate active power, is configured to control the current control unit to provide current to the resistor unit.

2. The arrangement according to claim 1, wherein the power absorption device comprises a separate branch for each phase that it is configured to be connected to, wherein the current control unit comprises a separate current control module for each branch, and the resistor unit comprises a separate resistor module for each branch, wherein the current control module and the resistor module of each branch are connected in series.

3. The arrangement according to claim 1, wherein the control device is configured to determine that there is a need to absorb active power from the AC power transmission system in excess of what the static synchronous compensator device is currently absorbing, where the need results from at least one of the state of charge of the energy storage unit having reached an upper limit, and the need for power absorption raising faster than the energy storage unit is able to handle.

4. The arrangement according to claim 1, wherein the power absorption device is configured to be connected to the AC power transmission system in parallel with the static synchronous compensator device.

5. The arrangement according to claim 1, wherein the power absorption device is configured to act as a backup device, with regard to power absorption, for the static synchronous compensator device.

6. The arrangement according to claim 1, wherein the power absorption device is configured to be connected to merely one or two phases of the AC power transmission system.

7. The arrangement according to claim 1, wherein the power absorption device is connected to a direct current side of the static synchronous compensator device in parallel with the energy storage unit.

8. The arrangement according to claim 1, wherein the current control unit comprises semiconductor elements.

9. A method of controlling an arrangement which is connected to an alternating current (AC) power transmission system, the arrangement comprising a static synchronous compensator device having a converter unit and an energy storage unit connected with the converter unit, and a power absorption device, the method comprising:

controlling the static synchronous compensator device to exchange power with the AC power transmission system, and controlling the power absorption device in dependence of a state of charge of the energy storage unit and a state of the power transmission system, including determining whether or not there is a need to absorb active power from the AC power transmission system in excess of what the static synchronous compensator device is currently absorbing, and when determining that there is the need, controlling the power absorption device to dissipate active power, wherein the power absorption device includes a resistor unit and a current control unit connected in series with the resistor unit; and wherein the arrangement further includes a control device connected with the static synchronous compensator device and with the power absorption device, said controlling the power absorption device to dissipate active power comprising controlling, by means of the control device, the current control unit to provide a current to the resistor unit.

10. The method according to claim 9, said determining comprising at least one of determining that the state of charge of the energy storage unit has reached an upper limit, and detecting that the need for power absorption is raising faster than the energy storage unit is able to handle.

11. The method according to claim 9, said controlling the static synchronous compensator device to exchange power with the AC power transmission system comprising controlling the state of charge of the energy storage unit to be between a state of fully discharged and a state of fully charged when there is no need for exchanging power with the AC power transmission system.

12. The method according to claim 9, wherein the power absorption device is connected to merely one or two phases of the AC power transmission system and is connected in parallel with the static synchronous compensator device, said controlling the static synchronous compensator device to exchange power with the AC power transmission system comprising balancing asymmetrical currents caused by the power absorption device.

13. The method according to claim 9, wherein the method stabilizes the frequency of the AC power transmission system.

\* \* \* \* \*